United States Patent [19]

Sulzbach

[11] 4,381,387

[45] Apr. 26, 1983

[54] QUATERPOLYMERS OF THE TETRAFLUOROETHYLENE/ETHYLENE TYPE

[75] Inventor: Reinhard A. Sulzbach, Burghausen, Fed. Rep. of Germany

[73] Assignee: Hoechst Aktiengesellschaft, Frankfurt, Fed. Rep. of Germany

[21] Appl. No.: 275,888

[22] Filed: Jun. 22, 1981

[30] Foreign Application Priority Data

Jun. 28, 1980 [DE] Fed. Rep. of Germany ....... 3024456
Apr. 14, 1981 [DE] Fed. Rep. of Germany ....... 3115030

[51] Int. Cl.³ .................... C08F 18/20; C08F 16/24; C08F 14/18
[52] U.S. Cl. .................... 526/247; 428/421; 428/422; 526/242; 526/245; 526/253; 526/254
[58] Field of Search ............ 526/242, 245, 247, 253, 526/254

[56] References Cited

U.S. PATENT DOCUMENTS

| | | | |
|---|---|---|---|
| 3,380,971 | 4/1968 | Chalmers et al. | 526/247 |
| 3,551,398 | 12/1970 | Kometani et al. | 526/254 |
| 3,817,951 | 6/1974 | Robinson | 526/254 |
| 4,058,578 | 11/1977 | Kuhls et al. | 526/247 |
| 4,078,135 | 3/1978 | Sulzbach et al. | 526/247 |
| 4,123,602 | 10/1978 | Ukihashi et al. | 526/253 |
| 4,166,165 | 8/1979 | Hisasue et al. | 526/245 |
| 4,256,856 | 3/1981 | Ito et al. | 526/254 |

*Primary Examiner*—Harry Wong, Jr.
*Attorney, Agent, or Firm*—Connolly and Hutz

[57] ABSTRACT

Quaterpolymers are described which are composed of the following copolymerized monomer units (in mole %):

(a) 55 to 30% of tetrafluoroethylene, (b) 60 to 40% of ethylene, (c) 10 to 1.5% of hexafluoropropylene and (d) 2.5 to 0.05% of a vinyl monomer which has "bulky" side chains and which can be, for example, a perfluorinated olefin, a perfluorinated vinyl ether, a perfluoroalkyl-substituted vinyl compound, a vinyl or allyl ether or an allyl or vinyl ester. The tensile strength and, in particular, the elongation at break at elevated temperatures is improved by the incorporation of both hexafluoropropylene and "bulky" vinyl monomers. The quaterpolymers are suitable for the manufacture of extruded articles, monofilaments and wire-coatings.

18 Claims, No Drawings

QUATERPOLYMERS OF THE TETRAFLUOROETHYLENE/ETHYLENE TYPE

The invention relates to quaterpolymers which have thermoplastic properties and are composed of copolymerizable units of tetrafluoroethylene, ethylene, hexafluoropropylene and a further monomer, and to the use thereof.

Copolymers composed of units of tetrafluoroethylene and ethylene have been known for a long time. They have an excellent resistance to chemicals, a high heat stability and good electrical properties. They can be processed from the melt by processes conventional for thermoplastics and they are suitable as starting materials for the manufacture of insulations for electric conductors and for the manufacture of films and injection-moldings.

These copolymers of tetrafluoroethylene and ethylene, with a melting point of about 275° C., have the disadvantage that they have poor tensile and elongation properties in a temperature range above 150° C., through which they must pass in any case when processed from the melt. For example, in the temperature range between 150° C. and 200° C., wire-coatings are markedly brittle and tear off even under a small strain. The elongation at break of these polymers, which is more than 250% at room temperature, is less than 20% at 200° C.

To overcome this disadvantage, copolymers have been produced which are composed of tetrafluoroethylene, ethylene and further copolymerizable vinyl monomer, that is to say which are terpolymers. Such terpolymers are known from U.S. Pat. No. 3,624,250 U.S. Pat. No. 4,166,165 German Offenlegungsschrift No. 2,836,296 and Japanese Laid-Open Patent Application Nos. 50-143,888, 50-143,889 and 50-143,890. Terpolymers of tetrafluoroethylene, ethylene and hexafluoropropylene are known from British Patent Specification No. 1,355,595 and U.S. Pat. No. 3,960,825.

In particular U.S. Pat. No. 3,624,250 has disclosed that a noticeable improvement in the tensile and elongation properties at a high temperature is achieved only if side chains having at least 2 carbon atoms are introduced into the terpolymer by the vinyl monomer used as the termonomer. To improve the properties, a "minimum bulkiness" of the side chains introduced is thus necessary. If termonomers are introduced, which introduce merely a single C atom into the side chain, such as hexafluoropropylene, perfluoro-(methyl vinyl) ether or isobutylene, an adequate improvement in the tensile strength and the elongation at break does not occur, as is stated in Example IX of U.S. Pat. No. 3,624,250. This also applies to the terpolymers according to U.S. Pat. No. 3,960,825 and British Pat. No. 1,355,595, which are composed of tetrafluoroethylene, ethylene and hexafluoropropylene.

The tensile and elongation properties, that is to say the values of tensile strength and elongation at break, of these terpolymers in the temperature range between 150° C. and 200° C. are not solely determined by the nature and size of the "bulky" side groups introduced into the chain, but they also greatly depend on the number of the side groups introduced. The quantity of the vinyl monomer to be incorporated as the termonomer is thus fixed, if certain tensile and elongation values are given beforehand, and it can be reduced only if a deterioration in these tensile and elongation properties is accepted at the same time.

As copolymerizable, "bulky" termonomers, various classes of compounds have been described; these can be divided into fluorine-free, partially fluorinated and perfluorinated vinyl monomers. It is a general observation that the chemical and thermal stability of such terpolymers increases considerably with an increasing degree of fluorination of the termonomer. However, the production costs of the termonomer, and hence also those of the terpolymer, also rise steeply with increasing degree of fluorination. From this point of view, it would be desirable to manage with a minimum quantity of termonomer in order to impair the chemical and thermal stability to the smallest possible degree if non-fluorinated or partially fluorinated vinyl compounds are employed, and to minimize the cost fraction of the termonomer if the expensive perfluorinated vinyl monomers are employed.

There is therefore a demand for copolymers of the tetrafluoroethylene/ethylene type, which, when compared with the conventional terpolymers, can be produced with the use of a smaller quantity of a "bulky" vinyl compound, which improves the tensile and elongation properties, as the third component, so that a satisfactory compromise between thermal and chemical stability on the one hand and the tensile and elongation behavior on the other hand is thus obtained even if non-fluorinated or partially fluorinated vinyl compounds are employed.

The present invention meets this demand by means of a thermoplastic fluorine-containing quaterpolymer composed of copolymerized units, in mole percent, of
(a) from 55% to 30% tetrafluoroethylene,
(b) from 60% to 40% ethylene,
(c) from 10% to 1.5% hexafluoropropylene, and
(d) from 2.5% to 0.05% of a vinyl monomer selected from one of the classes consisting of:
(d$_1$) perfluorinated olefins of the formula

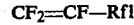

CF$_2$=CF—Rf1 wherein Rf1 is a perfluoroalkyl group having from 2 to 10 carbon atoms,
(d$_2$) perfluorinated vinyl ethers of the formula

CF$_2$=CF—O—Rf2 wherein Rf2 is a perfluoroalkyl group having from 2 to 10 carbon atoms,
(d$_3$) perfluorinated vinyl ethers of the formula

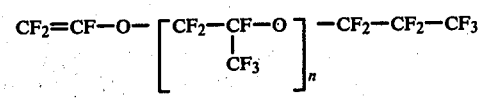

$$CF_2=CF-O-\left[CF_2-\underset{CF_3}{CF}-O\right]_n-CF_2-CF_2-CF_3$$

wherein n is an integer from 1 to 4,
(d$_4$) perfluorinated vinyl ethers of the formula

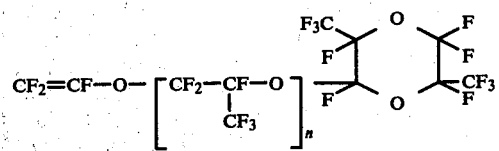

wherein n is 1 or zero, (d₅) perfluoro-2-methylene-4-methyl-1.3-dioxolane,
(d₆) perfluorinated vinyl ethers of the formula $$CF_2=CF-O-(CF_2)_n-COX_1$$

wherein $X_1$ is F, OH, OR$_1$, and NR$_2$R$_3$, R$_1$ is an alkyl group having from 1 to 3 carbon atoms, R$_2$ and R$_3$ each are H or identical with R$_1$, and n is an integer from 1 to 10, (d₇) perfluorinated vinyl ethers of the formula $$CF_2=CF-O-\left[CF_2-CF-O\right]_n-CF_2-CF_2-X_2$$
$$\phantom{CF_2=CF-O-\left[CF_2-}|\phantom{CF-O\right]_n-CF_2-CF_2-X_2}$$
$$\phantom{CF_2=CF-O-\left[CF_2-}CF_3$$

wherein $X_2$ is COOR$_4$, COOH, and CN, R$_4$ is an alkyl group having from 1 to 4 carbon atoms, and n is an integer from 1 to 4, (d₈) perfluoroalkyl-substituted vinyl compounds of the formula $$CH_2=CH-Rf3$$

wherein Rf3 is a perfluoroalkyl group having from 2 to 10 carbon atoms, (d₉) 1.1.1-trifluoro-2-(trifluoromethyl)-4-pentene-2-ol, (d₁₀) allyl-1-hydroxyhexafluoroisopropyl ether, (d₁₁) fluorinated allyl ethers of the formula $$CH_2=CR_5-CH_2-O-CF_2-CFX_3H$$

wherein $X_3$ is F, Cl, and trifluoromethyl, and R$_5$ is H or CH$_3$, (d₁₂) fluorinated vinyl ethers of the formula $$CH_2=CH-O-CF_2-CFX_3H$$

wherein $X_3$ is F, Cl, and trifluoromethyl, (d₁₃) allyl esters of the formula $$CH_2=CR_6-CH_2-OCO-R_7$$

wherein R$_6$ is H or CH$_3$, and R$_7$ is an alkyl group having from 1 to 3 carbon atoms, and (d₁₄) vinyl esters fo the formula $$CH_2=CH-O-CO-R_8$$

wherein R$_8$ is an alkyl group having from 1 to 3 carbon atoms.

Surprisingly, it has been found that the tensile and elongation behavior of such a copolymer of the ethylene/tetrafluoroethylene type, that is to say its tensile strength and in particular its elongation at break, can once more be substantially improved if, in addition to the "bulky" vinyl compound, additionally 1.5 to 10 mole %, preferably 3 to 8 mole %, in particular 3 to 5 mole %, of copolymerized units of hexafluoropropylene are incorporated into the copolymer. This finding is surprising because, in accordance with the behavior of the known terpolymers, it should have been expected that hexafluoropropylene, because of its lack of "bulkiness," would not make a significant contribution to the improvement of the tensile and elongation properties in the temperature range between 150° C. and 200° C. If quantitively the same amount of "bulky" vinyl monomer is incorporated, the quaterpolymers according to the invention are superior to the known terpolymers with respect to their tensile strength and their elongation at break, both at room temperature and in the temperature range between 150° C. and 200° C. In particular, the substantially improved elongation at break at high temperatures has the consequence that shaped articles manufactured from the quaterpolymers according to the invention, such as, for example, injection-moldings or wire-coatings, can be exposed to an increased mechanical stress at such temperatures and are thus less susceptible to cracking during their manufacture and in use.

If defined values of the elongation at break at a temperature between 150° C. and 200° C. are given beforehand as the desired target, these values can be achieved, in the case of the quaterpolymers according to the invention, with a smaller quantity of the "bulky" vinyl monomer.

These facts are evident from the values in Table III. The latter shows the values of tensile strength and elongation at break, measured at 23° C. and 160° C., which are obtained, on the one hand, with quaterpolymers according to the invention (Examples 1 to 18) and, on the other hand, with terpolymers of corresponding composition, which do not contain any hexafluoropropylene units and are adjusted to melt-flow index values in the same range. The terpolymers and quaterpolymers to be compared were in each case prepared under the same polymerization conditions. Table III shows that the quaterpolymers according to the invention, which additionally contain hexafluoropropylene units and approximately the same incorporated amount of the particular "bulky" vinyl monomers used, without exception give better values of the elongation at break, both at room temperature and at 160° C., than the corresponding terpolymers of the same composition but without hexafluoropropylene. On the other hand, the quaterpolymers according to the invention also show a substantially more favorable tensile and elongation behavior than the known terpolymers which are built up from tetrafluoroethylene, ethylene and hexafluoropropylene (Table III, Example 4, compared with Comparison Example E).

It can also be seen from Table III that, to achieve a certain elongation at break at 160° C., it is necessary, in the case of terpolymers produced without hexafluoropropylene, to incorporate several times the quantity of "bulky" vinyl component, as compared with the quaterpolymers according to the invention.

Thus, a comparison of Example 4 with Comparison Example A of Table III shows that, if an elongation at break of 500% at 160° C. is to be achieved, about 2.5 times the quantity of perfluoro-(propyl vinyl) ether must be incorporated in a terpolymer, as compared with a quaterpolymer according to the invention. Example 13 and Comparison Examples I and J of Table III show that, to achieve an elongation at break of 600% at 160° C., about twice the quantity of tetrafluoroethyl allyl ether must be introduced in the case of the terpolymer or, in other words, an elongation at break of only 25% at 160° C. is achieved when the same quantity is incorporated.

These comparisons clearly show that, as a result of the additional incorporation, according to the invention, of hexafluoropropylene units into the copolymer, the incorporated quantity of the "bulky" vinyl compound can, surprisingly, be reduced and, in spite of the reduced content, products having good values of elongation at break at high temperature and having a low degree of brittleness are obtained.

To prepare the quaterpolymers according to the invention, various classes of compounds having a vinyl grouping can be employed as the "bulky" vinyl monomers. These are vinyl monomers from the following groups:

(d$_1$) Perfluorinated olefins of the formula CF$_2$=CF—Rf1, in which Rf1 is a perfluoroalkyl radical having 2 to 10, preferably 2 to 5, C atoms.

The preferred compounds include, in particular, perfluoropentene, perfluorohexene and perfluoroheptene. The preparation of such longer-chain perfluorinated olefins is known and is described, for example, in U.S. Pat. No. 2,668,864.

(d$_2$) Perfluorinated vinyl ethers of the formula

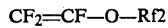

in which Rf2 is a perfluoroalkyl radical having 2 to 10, preferably 2 to 4, C atoms. The perfluoro-n-ethyl, perfluoro-n-butyl and, in particular, the perfluoro-n-propyl radical should be mentioned. The preparation of such perfluoro-(alkyl vinyl) ethers is known from U.S. Pat. No. 3,180,895.

(d$_3$) Perfluorinated vinyl ethers of the formula

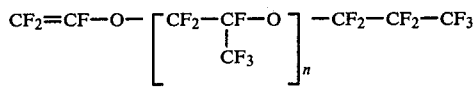

in which n is 1 to 4, preferably 1 or 2. The preparation of such perfluorinated vinyl ethers is known from U.S. Pat. No. 3,450,684.

(d$_4$) Perfluorinated vinyl ethers of the formula

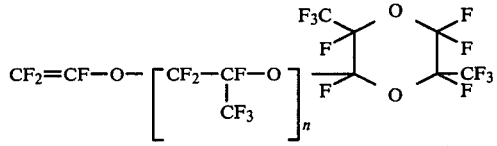

in which n is 0 to 1, preferably 0. The preparation of these monomers is described in U.S. Pat. No. 4,013,689.

(d$_5$) Perfluoro-2-methylene-4-methyl-1,3-dioxolane, the preparation of which is known from U.S. Pat. No. 3,308,107.

(d$_6$) Perfluorinated vinyl ethers of the general formula CF$_2$=CF—O—(CF$_2$)$_n$—COX$_1$, in which X$_1$ represents F, OH, OR$_1$ or NR$_2$R$_3$, R$_1$ being an alkyl group having 1 to 3 C atoms, and R$_2$ and R$_3$ each representing a hydrogen atom or R$_1$, and n is a number from 1 to 10. The preparation of such monomers is known from British Pat. No. 1,145,445. Preferably, X is OH or OCH$_3$.

(d$_7$) Fluorinated vinyl ethers of the formula

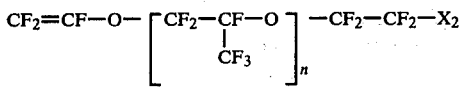

in which X$_2$ represents COOR$_4$, COOH or CN, R$_4$ denotes an alkyl group having 1 to 3 C atoms and n denotes an integer from 1 to 4. The preparation of such comonomers is described in U.S. Pat. No. 4,138,426. Preferably, X$_2$ is COOH or COOCH$_3$.

(d$_8$) Perfluoroalkyl-substituted vinyl compounds of the formula CH$_2$=CH—Rf3, in which Rf3 is a perfluoroalkyl radical having 2 to 10, preferably 2 to 6, C atoms. Such partially fluorinated olefins are prepared by an addition reaction of ethylene with a perfluoroalkyl iodide and subsequent dehydrohalogenation by means of an alkali metal hydroxide, as described in U.S. Pat. No. 3,535,381.

(d$_9$) 1,1,1-Trifluoro-2-(trifluoromethyl)-4-penten-2-ol

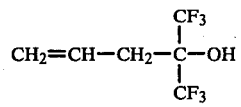

the preparation of which is known from U.S. Pat. No. 3,444,148.

(d$_{10}$) Allyl 1-hydroxy-hexafluoroisopropyl ether

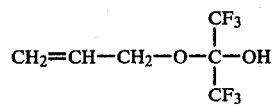

which is produced by an addition reaction of allyl alcohol with hexafluoroacetone, as described in French patent Specification No. 2,178,724.

(d$_{11}$) Compounds of the general formula CH$_2$=CR$_5$—CH$_2$—O—CF$_2$—CFX$_3$H, in which R$_5$ is H or CH$_3$ and X$_3$ is F, Cl or trifluoromethyl, preferably F. Such monomers can be prepared by an addition reaction of the corresponding fluoroolefin or chlorofluoroolefin with allyl alcohol, as described in U.S. Pat. No. 2,975,161.

(d$_{12}$) Fluorinated vinyl ethers of the formula CH$_2$=CH—O—CF$_2$—CFX$_3$H, in which X$_3$ is F, Cl or trifluoromethyl, preferably F. They can be prepared according to U.S. Pat. No. 2,631,975.

(d$_{13}$) Allyl esters or methallyl esters of the formula CH$_2$=CH—CH$_2$—O—CO—R$_5$, in which R$_5$ is an alkyl radical having 1 to 3 C atoms, preferably a methyl radical.

(d$_{14}$) Vinyl esters of the general formula CH$_2$=CH—O—CO—R$_6$, in which R$_6$ is an alkyl radical having 1 to 3 C atoms, in particular a methyl radical.

Amongst these groups mentioned above, the groups (d$_1$), (d$_8$), (d$_9$), (d$_{11}$) and (d$_{12}$) are preferred, and (d$_2$), (d$_3$) and (d$_4$) are particularly preferred.

The scope of this invention also covers the possibility of incorporating mixtures of such "bulky" vinyl monomers which then altogether form the quater-component, in which case, however, the overall polymer can be composed of more than 4 monomers.

It is a fact that the vinyl monomers listed above generally are largely inactive telogenically so that a quaterpolymer within the molecular weight range suitable for thermoplastic processing is formed. The bulkiness of the side chains introduced by these vinyl monomers entails an influence on the crystallization behavior of the copolymer; this is the case if side chains having at least 2 carbon atoms are introduced. If the emphasis is exclusively on an improvement of the tensile and elongation behavior, the type and nature of the incorporated "bulky" side chain is largely not critical. If, additionally, the best possible chemical and thermal stability of the copolymer is required, those vinyl monomers are to be preferred which are fluoro-substituted to a high degree, and preferably are perfluorinated.

In general, it can be stated that, by incorporating 3 to 5 mole % of copolymerized units of hexafluoropropylene into the quaterpolymer, the content of "bulky" vinyl monomer can be reduced by a factor of 2 to 3.5, as compared with the corresponding terpolymers.

The content of "bulky" vinyl monomer in the quaterpolymers according to the invention is determined, above all, by the desired properties of the product. It is 0.05 to 2.5 mole %, preferably 0.1 to 1 mole % and in particular 0.2 to 0.8 mole %, of copolymerized units which are derived from one of the abovementioned "bulky" vinyl monomers. The content of copolymerized tetrafluoroethylene units is 55 to 30 mole %, preferably 55 to 40 mole %, and the content of copolymerized ethylene units is 60 to 40 mole %, preferably 55 to 45 mole %.

To ensure that the quaterpolymers according to the invention can be processed from the melt by thermoplastic shaping methods, the molecular weight should be adjusted in such a way that the melt viscosity, measured under a shear stress of $1 \times 10^5$ Pa at 300° C., is in the range from $4 \times 10^2$ to $2 \times 10^4$ Pas. The melt flow index (MFI value; MFI=melt flow index) is generally used as a measured of the flow of the polymer. The MFI value measured at 300° C. under a load weighing 11 kg should be within the range from 5 to 200 g/10 minutes, preferably 10 to 100 g/10 minutes. Copolymers having an MFI value of 15 to 50 g/10 minutes are particularly suitable for the production of coatings on electrical conductors.

Depending on their chemical composition, the quaterpolymers according to the invention have a melting point between 245° and 280° C., measured as the minimum of the melting curve by differential thermoanalysis. With an increasing content of copolymerized hexafluoropropylene units in the quaterpolymer, the melting point is lowered within this range.

The quaterpolymers according to the invention can be prepared by known polymerization processes, that is to say the polymerization can be carried out by the process of solution polymerization, of suspension polymerization, of emulsion polymerization and also that of bulk polymerization or gas phase polymerization. The preparation by polymerization in organic solvents, or by suspension polymerization or emulsion polymerization in an aqueous phase, is preferred. In addition to organic solvents and water, mixtures of organic solvents and water can also be used as the reaction media. Preferred organic solvents are fluoroalkanes or chlorofluoroalkanes having 1 to 4 C atoms.

The polymerization in chlorofluoroalkanes as the solvent is described, for example, in U.S. Pat. No. 3,528,954, and the polymerization in mixtures of fluoroalkanes or chlorofluoroalkanes and water is described in the Japanese Allowed Patent No. 49-011,746 and the Japanese Laid-Open Pat. Appln. No. 49-024,295. The copolymerization can also be carried out in mixtures of tert.-butyl alcohol and water, for example as known from U.S. Pat. No. 2,468,664. The copolymerization in a purely aqueous reaction medium is, in particular, known from U.S. Pat. No. 3,859,252.

The reaction conditions for carrying out the copolymerization depend on the selected polymerization process. The reaction temperature is within the conventional range between −50° C. and +150° C., preferably in the range from +20° C. to +100° C.

If the copolymerization is carried out in organic solvents, such as, in particular, fluoroalkanes or chlorofluoroalkanes, the polymerization initiators used are preferably the conventional organic peroxy compounds or azo compounds, which provide free radicals. It is, however, also possible to start the polymerization by high-energy radiation, such as, for example, gamma-rays from a radioactive element. When the copolymerization is carried out in an aqueous medium, the conventional, free radical-forming, water-soluble polymerization initiators, such as, for example, ammonium persulfate, can be employed. Preferred initiators in the copolymerization in an aqueous medium are the acids of manganese and salts thereof, described in U.S. Pat. No. 3,859,262.

The copolymerization to give the quaterpolymers according to the invention is carried out under a total monomer pressure within the conventional range of 2 to 50 bars. The composition is controlled in the usual way by the molar ratios of the monomer components. In the polymerization reactors, the molar ratio of the sum of tetrafluoroethylene and hexafluoropropylene to ethylene should be within the range of 60:40 to 85:15, preferably from 65:35 to 75:25. A 1.05-fold to 5-fold excess of the "bulky" vinyl monomer, relative to the quantity which it is desired to incorporate in the copolymer, is introduced over the duration of the polymerization. In order to achieve a uniform composition of the quaterpolymer, the molar ratios of the monomers are preferably kept constant over the entire duration of the polymerization, by feeding in the monomers. Unconverted monomers can be recovered after the copolymerization by known processes.

To adjust the molecular weight, or the MFI value resulting therefrom, conventional chain transfer agents are added to the copolymerization. If the copolymerization is carried out in organic solvents or in mixtures thereof with water, these are the known hydrogen-containing organic compounds, such as, for example, cyclohexane or acetone. If the reaction is carried out in an aqueous system, dialkyl esters of malonic acid are particularly preferred.

If the copolymerization is carried out in an aqueous phase by the emulsion polymerization process, the quaterpolymers according to the invention are obtained in the form of aqueous, colloidal dispersions with a solid polymer content of 15 to 30% by weight, relative to aqueous medium. The dispersion particles have a mean particle diameter of 0.05 to 0.35 μm, preferably of 0.10 to 0.25 μm. The size distribution of the dispersion particles is very narrow and the particles have a spherical shape. Moreover, they have a viscosity, measured with a rotary viscosimeter at 20° C., in the range from 2 to 4 mPas and an exceptionally high stability towards the effect of shearing forces. The solid polymer can be obtained from these dispersions by conventional coagulation methods, for example by stirring or by adding coagulating agents, and subsequent drying.

The quaterpolymers according to the invention can be processed from the melt by thermoplastic shaping processes to give films, tubes, bars, injection-molded articles and other shaped articles. They are furthermore suitable for the production of monofilaments which have good mechanical properties and can be further processed to woven fabrics with a good stability to heat and chemicals. The quaterpolymers according to the invention, having a $MFI_{11}$ value of 15 to 50 g/10 minutes, are particularly suitable for the production of coatings for electrical conductors. The wire-coatings thus produced are not brittle at a high temperature and exhibit no tendency to form cracks. At the same content of "bulky" vinyl monomer, wire-coatings produced from the quaterpolymers according to the invention give a better result in the stress cracking test and have a higher elongation at break and tensile strength than the corresponding terpolymers. Moreover, thin wire insulations prepared from the quaterpolymers according to the invention have fewer defects and electrical breakdowns than coatings which have been prepared under the same conditions from the corresponding terpolymers.

The quaterpolymers according to the invention differ substantially in their wide-angle X-ray spectrum from the corresponding terpolymers which do not contain any hexafluoropropylene. The evaluation of these spectra shows that the crystal structure of the quaterpolymers considerably differs from that of the terpolymers. The more advantageous application properties of the quaterpolymers according to the invention are ascribed to the changes in the crystal structure, which are caused by the additional incorporation of hexafluoropropylene.

Conventional fillers and/or pigments can be incorporated into the quaterpolymers according to the invention. Thus, for example, they can be reinforced by 5 to 50% by weight of glass fibers which, if appropriate, have been treated beforehand with a silane coupling agent.

The characteristic parameters of the quaterpolymers according to the invention, and of the terpolymers prepared for comparison, as given in the description and in the examples, are determined by the following measurement methods:

1. Fluorine content

The fluorine content (% by weight) of the copolymers is determined by combustion in a Wickbald apparatus and by subsequent titration of the residue with thorium nitrate in a potentiograph.

2. Content of hexafluoropropylene

The content of hexafluoropropylene (in % by weight) is determined by IR analysis of films which have been pressed at 280° C. and are between 100 and 300 μm thick. The thickness is measured with a micrometer screw. The analyses are carried out with a Fourier-Transform IR spectrophotometer from Messrs. Nicolet, model HX-1. For compensation, a similar film of a copolymer comprising exclusively tetrafluoroethylene and ethylene is employed. The band at $\nu=490$ cm$^{-1}$ is evaluated. The hexafluoropropylene content is calculated from the following formula:

$$\frac{\text{Hexafluoropropylene}}{(\% \text{ by weight})} = \frac{\text{Extinction at 490 cm}^{-1}}{\text{Thickness (mm)}} \cdot 3$$

3. Content of "bulky" vinyl monomer

The incorporation of the "bulky" vinyl monomers of groups ($d_1$) to ($d_{14}$) is determined by mass balance, by determining the total amount of the particular monomer fed to the reactor and subtracting the amount of the particular monomer which remains in the reactor after the copolymerization.

4. Content of tetrafluoroethylene

The content of tetrafluoroethylene is obtained from the fluorine value, after subtracting that proportion of the fluorine which is due to the hexafluoropropylene and to the particular "bulky" vinyl monomer, from the analytically determined fluorine content.

5. Density

The density is determined in accordance with the method of DIN Standard Specification 53,479 on a 2 mm thick strand extruded from the melt.

6. MFI value (melt flow index)

The determination is carried out in accordance with the method of DIN Standard Specification 53,735-70 with a nozzle of 2.1 mm in diameter, a length of 8 mm and at 300° C. under a load weighing 11 kg.

7. Melting point

The melting point is given as the minimum of the melting range, which is measured with a differential scanning calorimeter.

8. Elongation at break and tensile strength

The elongation at break and the tensile strength are measured on a test specimen according to ASTM D-1708, which is punched from a pressure-sintered plate having dimensions of 95×95×2 mm. The plate is prepared by heating 38 g of powder, or of granules obtained from the melt, of the copolymer to 300° C. for at least 1 hour and cooling under a maximum pressure of 200 bars. The pressure of 200 bars is reached within 5 minutes. The elongation at break and the tensile strength are tested at 23° C. and at 160° C. in accordance with ASTM D-638.

9. Stress-cracking test

The wire provided with a 250 μm thick coating of the particular copolymer is heat-treated for 3 hours at 200° C. This wire is then wound five times around its own diameter. Five parallel samples are prepared in this way. The wound wires are heat-treated once more for 3 hours at 200° C. The windings are then opened up and tested for cracks and for dielectric strength.

10. Testing of the mechanical properties of the wire-coatings

The mechanical properties of wire-coatings are tested in accordance with VDE Test Instructions No. 0472 and No. 0881.

The invention is illustrated by the following examples:

EXAMPLES 1 TO 12 AND COMPARISON EXAMPLES A TO H

The quaterpolymers of Examples 1 to 12, according to the invention, and the terpolymers of Comparison Examples A to H are prepared under the following reaction conditions:

120 l of desalinated water in which 485 g of diammonium oxalate monohydrate, 485 g of perfluorooctanoic acid and 135 g of diethyl malonate are dissolved are introduced into an enamelled polymerization reactor which has a total volume of 190 l and is equipped with a baffle and an impeller stirrer. The air in the remaining gas space of the polymerization reactor is displaced carefully by flushing with nitrogen and then with tetrafluoroethylene. The stirrer speed is adjusted to 235 revolutions/minute. Hexafluoropropylene is then initially introduced in quantities of 1,500 g in Examples 1 to 4 and 7 to 12, 400 g in Example 5 and 3,000 g in Example 6. The Comparison Examples A to D and F to H are carried out without an addition of hexafluoropropylene. Comparison Example E is carried out in accordance with the instructions for Examples 1 to 12 but, in this case, no further monomer is present apart from tetrafluoroethylene, ethylene and hexafluoropropylene (1,500 g introduced initially).

Subsequently, tetrafluoroethylene is formed in up to a total monomer pressure of 13.7 bars, and ethylene is then forced in up to a total monomer pressure of 17 bars. Thereafter, the quantities of the particular "bulky" vinyl monomer, indicated in Tables I and II, are added. The polymerization is then initiated by introducing a solution of potassium permanganate, containing 20 g of $KMnO_4$ per liter of water. After the start of polymerization, the supply of potassium permanganate solution is regulated such that a polymerization rate of about 60 to 100 g/l. hour is achieved. The polymerization temperature is 26° to 27° C. The resulting heat of polymerization is removed with a coolant via the cooling jacket of the polymerization reactor.

The total monomer pressure of 17 bars is automatically maintained by continuous feeding-in of a tetrafluoroethylene/ethylene mixture in a molar ratio of 1:1. In Examples 1 to 4 and 7 to 12, according to the invention, and in Comparison Example E, 3,100 g of hexafluoropropylene (1,200 g of hexafluoropropylene in Example 5 and 6,400 g of hexafluoropropylene in Example 6) and the amounts of the particular vinyl monomer given in Tables I and II are metered in continuously during the course of the polymerization.

The reaction is terminated at a solids content, relative to the aqueous medium, of 20 to 22% by weight by letting down the monomer mixture. The polymer is obtained in the form of an aqueous dispersion which is then coagulated by stirring. The resulting polymer solids are separated from the liquor, washed several times with water and then dried under a nitrogen atmosphere at 200° C. for 15 hours and subsequently granulated from the melt. The particular amounts of polymer solids obtained are given in Tables I and II. Tables I and II also contain the following characteristic parameters of the quaterpolymers of Examples 1 to 12, according to the invention, and of the copolymers of Comparison Examples A to H: fluorine content, melting point by the differential scanning calorimetry method (DSC) and the density.

EXAMPLES 13 TO 18. COMPARISON EXAMPLES I TO L 4.8 l of 1,1,2-trichlorotrifluoroethane are initially introduced into an enamelled polymerization reactor which has a total volume of 18 l and is equipped with a baffle and an impeller stirrer. The air in the reaction vessel is displaced by ethylene. The stirrer speed is 100 revolutions/minute. The following are metered into the reaction vessel: 290 g of hexafluoropropylene (580 g in Examples 14 and 18), 10 g of the particular vinyl monomers given in Tables I and II (20 g in Comparison Example J) and dissolved in 100 ml of 1,1,2-trichlorotrifluoroethane, and the particular amount of cyclohexane, given in Tables I and II, likewise dissolved in 100 ml of 1,1,2-trichlorotrifluoroethane.

The contents of the reactor are then heated up to 65° C. and the stirrer speed is increased to 250 revolutions/minute. Tetrafluoroethylene is then forced in up to a total pressure of 7.8 bars and, subsequently, ethylene is forced in up to a total pressure of 10.7 bars. Thereafter, 1 g of bis-(4-tert.-butylcyclohexane peroxydicarbonate), dissolved in 300 ml of 1,1,2-trichlorotrifluorethane, is metered in. After the start of polymerization, a mixture of ethylene and tetrafluoroethylene in a molar ratio of 1:1 is fed to the reaction vessel, maintaining a constant total monomer pressure of 10.7 bars.

The copolymerization is terminated at a copolymer content, relative to 1,1,2-trichlorotrifluoroethane introduced, of about 6% by weight. The reactor contents are then cooled to about −5° C., the unconverted monomers are let down, the reactor contents are discharged and the solvent is distilled off together with the vinyl monomers still dissolved therein. The copolymer obtained is then heated, in a nitrogen atmosphere, at 100° C. for 12 hours. Subsequently, the partially caked product is ground on a hammer mill to give a powder having a particle size of 300 to 400 μm. The particular amounts, in kg, of copolymer powder obtained are given in Tables I and II. The fluorine content, melting point by DSC and density, as characteristic parameters, are also listed in Tables I and II.

In Table III, the values of the tensile strength and of the elongation at break at 160° C. and at 23° C. are compiled, the quaterpolymers according to the invention being in each case contrasted with the terpolymers of corresponding composition. Comparison Example E shows the properties of the terpolymer produced from tetrafluoroethylene, ethylene and hexafluoropropylene. The composition of the copolymers (in mole % of the incorporated copolymerized units of the particular monomers) and the MFI value, measured at 300° C. under a load weighing 11 kg are also listed in Table III.

TABLE I

Preparation conditions and properties of the quaterpolymers according to the invention

| Example No. | 1 | 2 | 3 | 4 | 5 | 6 | 7 | 8 | 9 | 10 |
|---|---|---|---|---|---|---|---|---|---|---|
| Type of the "bulky" vinyl monomer | I | I | I | I | I | I | II | III | IV | V |
| Feed of "bulky" vinyl monomer (% by weight, relative to polymer obtained) | 5.8 | 4.0 | 2.7 | 1.4 | 5.7 | 0.8 | 6.5 | 0.8 | 0.7 | 4.1 |
| amount initially introduced (% by weight) | 1.4 | 1.0 | 0.7 | 0.3 | 1.4 | 0.2 | 1.6 | 0 | 0.2 | 1.0 |
| amount subsequently metered in (% by weight) | 4.4 | 3.0 | 2.0 | 1.0 | 4.2 | 0.6 | 4.9 | 0.8 | 0.4 | 3.1 |
| Feed of hexafluoropropylene (% by weight, relative to polymer obtained) | 13.3 | 12.2 | 12.5 | 12.7 | 4.5 | 24 | 12.4 | 12.2 | 13.1 | 12.7 |
| Polymer (kg) | 34.7 | 37.8 | 36.8 | 36.1 | 35.3 | 39.0 | 37.0 | 37.7 | 35 | 36.3 |
| Polymerization medium | $H_2O$ | $H_2O$ | $H_2O$ | $H_2O$ | $H_2O$ | $H_2O$ | $H_2O$ | $H_2O$ | $H_2O$ | $H_2O$ |
| Chain transfer agent | MDE | MDE | MDE | MDE | MDE | MDE | MDE | MDE | MDE | MDE |
| Chain transfer agent (% by weight, | | | | | | | | | | |

TABLE I-continued
Preparation conditions and properties of the quaterpolymers according to the invention

| | | | | | | | | | | |
|---|---|---|---|---|---|---|---|---|---|---|
| relative to polymer obtained) | 0.39 | 0.36 | 0.37 | 0.37 | 0.38 | 0.35 | 0.36 | 0.36 | 0.38 | 0.37 |
| Fluorine content (% by weight) | 61.0 | 60.6 | 61.5 | 59.8 | 61.3 | 63.0 | 60.9 | 61.3 | 59.8 | 61.5 |
| Melting point by DSC (°C.) | 266 | 267 | 264 | 271 | 280 | 247 | 273 | 271 | 268 | 268 |
| Density (g/cm$^3$) | 1.714 | 1.717 | 1.726 | 1.743 | 1.722 | 1.747 | 1.730 | 1.726 | 1.717 | 1.717 |

| Example No. | 11 | 12 | 13 | 14 | 15 | 16 | 17 | 18 |
|---|---|---|---|---|---|---|---|---|
| Type of the "bulky" vinyl monomer | IX | IX | III | VI | VII | VIII | I | I |
| Feed of "bulky" vinyl monomer (% by weight, relative to polymer obtained) | 1.1 | 2.2 | 2.4 | 2.7 | 2.7 | 2.6 | 2.4 | 3.8 |
| amount initially introduced (% by weight) | 0.3 | 1.1 | 2.4 | 2.7 | 2.7 | 2.6 | 2.4 | 3.8 |
| amount subsequently metered in (% by weight) | 0.8 | 1.1 | 0 | 0 | 0 | 0 | 0 | 0 |
| Feed of hexafluoropropylene (% by weight, relative to polymer obtained) | 12.4 | 12.8 | 69 | 156 | 77 | 76 | 69 | 219 |
| Polymer (kg) | 37.0 | 36.0 | 0.420 | 0.370 | 0.376 | 0.380 | 0.420 | 0.265 |
| Polymerization medium | H$_2$O | H$_2$O | F 113 | F 113 | F 113 | F 113 | F 113 | F 113 |
| Chain transfer agent | MEE | MEE | CHX | CHX | CHX | CHX | CHX | CHX |
| Chain transfer agent (% by weight, relative to polymer obtained) | 0.36 | 0.37 | 3.0 | 2.5 | 2.3 | 3.3 | 2.8 | 4.4 |
| Fluorine content (% by weight) | 60.3 | 59.7 | 60.2 | 59.6 | 59.9 | 59.7 | 61.4 | 61.8 |
| Melting point by DSC (°C.) | 272 | 271 | 265 | 272 | 268 | 277 | 274 | 255 |
| Density (g/cm$^3$) | 1.740 | 1.733 | 1.684 | 1.710 | 1.694 | 1.710 | 1.709 | 1.686 |

TABLE II
Preparation conditions and properties of terpolymers known according to the state of the art

| Comparison Example No. | A | B | C | D | E | F | G | H | I | J | K | L |
|---|---|---|---|---|---|---|---|---|---|---|---|---|
| Type of the "bulky" vinyl monomer | I | I | I | I | none | II | III | IV | III | III | VI | VII |
| Feed of "bulky" vinyl monomer (% by weight, relative to polymer obtained) | 5.6 | 4.3 | 2.9 | 1.4 | — | 6.8 | 0.8 | 0.7 | 2.4 | 5 | 2.1 | 2.8 |
| amount initially introduced (% by weight) | 1.4 | 1.1 | 0.7 | 0.4 | — | 1.7 | — | 0.2 | 2.4 | 5 | 2.1 | 2.8 |
| amount subsequently metered in (% by weight) | 4.2 | 3.3 | 2.1 | 1.1 | — | 5.1 | 0.8 | 0.4 | — | — | — | — |
| Polymer (kg) | 36.0 | 34.6 | 35.0 | 34.6 | 37.2 | 35.5 | 36.0 | 35.0 | 0.420 | 0.400 | 0.470 | 0.360 |
| Polymerization medium | H$_2$O | H$_2$O | H$_2$O | H$_2$O | H$_2$O | H$_2$O | H$_2$O | H$_2$O | F 113 | F 113 | F 113 | F 113 |
| Chain transfer agent | MDE | MDE | MDE | MDE | MDE | MDE | MDE | MDE | CHX | CHX | CHX | CHX |
| Chain transfer agent (% by weight, relative to polymer obtained) | 0.37 | 0.39 | 0.38 | 0.39 | 0.36 | 0.38 | 0.37 | 0.38 | 3.0 | 3.1 | 2.0 | 2.8 |
| Fluorine content (% by weight) | 61.2 | 60.0 | 60.3 | 60.5 | 61.5 | 58.8 | 60.8 | 59.9 | 60.8 | 60.6 | 60.4 | 60.2 |
| Melting point by DSC (°C.) | 282 | 287 | 293 | 294 | 267 | 284 | 286 | 293 | 280 | 269 | 284 | 280 |
| Density (g/cm$^3$) | 1.731 | 1.725 | 1.720 | 1.737 | 1.726 | 1.706 | 1.741 | 1.736 | 1.726 | 1.708 | 1.759 | 1.724 |

TABLE III
Composition and properties of the quaterpolymers, compared with the corresponding terpolymers

| Example/Comparison Example No. | 1 | A | 2 | B | 3 | C | 4 | D | E | 5 | 6 | 7 | F | 8 | G |
|---|---|---|---|---|---|---|---|---|---|---|---|---|---|---|---|
| Incorporated amount (mole %) of: | | | | | | | | | | | | | | | |
| Tetrafluoroethylene | 46.8 | 52.7 | 46.8 | 50.5 | 48.2 | 51.2 | 44.5 | 51.8 | 48.5 | 50.9 | 47.0 | 47.9 | 48.2 | 48.8 | 52.8 |
| Ethylene | 48.1 | 46.6 | 48.7 | 49.0 | 46.9 | 48.4 | 50.5 | 47.9 | 46.8 | 46.8 | 44.3 | 48.1 | 51.5 | 46.8 | 46.9 |
| "Bulky" vinyl monomer | 0.8 | 0.7 | 0.5 | 0.5 | 0.4 | 0.4 | 0.3 | 0.3 | — | 0.7 | 0.4 | 0.4 | 0.4 | 0.3 | 0.2 |
| Type of "bulky" vinyl monomer | I | I | I | I | I | I | I | I | none | I | I | II | II | III | III |
| Hexafluoropropylene | 4.4 | — | 3.9 | — | 4.5 | — | 4.7 | — | 4.7 | 1.6 | 8.4 | 3.6 | — | 4.2 | — |
| MFI$_{11}$ value (300° C.) | 33 | 12 | 36 | 25 | 36 | 44 | 30 | 20 | 28 | 32 | 40 | 24 | 8 | 42 | 14 |
| Tensile strength, 160° C. (N/mm$^2$) | 7.3 | 7.5 | 7.5 | 7.4 | 5.5 | 6.6 | 6.0 | 6.5 | 4.3 | 6.5 | 5.6 | 5.2 | 6.3 | 5.1 | 3.8 |
| Elongation at break, 160° C. (%) | 815 | 505 | 720 | 245 | 625 | 65 | 550 | 55 | 75 | 520 | 425 | 505 | 80 | 415 | 20 |
| Tensile strength, 23° C. (N/mm$^2$) | 52.5 | 42.3 | 44.8 | 43.8 | 43.7 | 34.9 | 40.5 | 37.3 | 36.2 | 49.7 | 38.1 | 47 | 40.2 | 49.5 | 37.6 |
| Elongation at break, 23° C. (%) | 500 | 280 | 390 | 240 | 465 | 300 | 430 | 300 | 370 | 435 | 425 | 475 | 290 | 520 | 315 |

| Example/Comparison Example No. | 9 | H | 10 | 11 | 12 | 13 | I | J | 14 | K | 15* | L* | 16 | 17 | 18 |
|---|---|---|---|---|---|---|---|---|---|---|---|---|---|---|---|
| Incorporated amount (mole %) of: | | | | | | | | | | | | | | | |
| Tetrafluoroethylene | 45.6 | 51.4 | 49.0 | 46.1 | 45.2 | 49.4 | 52.9 | 52.5 | 45.4 | 51.7 | 48.5 | 51.5 | 48.1 | 51.0 | 49.3 |
| Ethylene | 49.5 | 48.2 | 46.6 | 49.1 | 50.1 | 48.2 | 46.6 | 45.0 | 50.7 | 48.1 | 48.9 | 47.9 | 50.0 | 46.5 | 46.1 |
| "Bulky" vinyl monomer | 0.4 | 0.4 | 0.3 | 0.2 | 0.4 | 0.5 | 0.5 | 1.0 | 0.2 | 0.2 | 0.6 | 0.6 | 0.1 | 0.2 | 0.3 |
| Type of "bulky" vinyl monomer | IV | IV | V | IX | IX | III | III | III | VI | VI | VII | VII | VIII | I | I |
| Hexafluoropropylene | 4.5 | — | 4.0 | 4.5 | 4.3 | 1.8 | — | — | 3.7 | — | 1.9 | — | 1.8 | 2.3 | 4.4 |
| MFI$_{11}$ value (300° C.) | 37 | 11 | 40 | 23 | 40 | 55 | 25 | 31 | 24 | 12 | 27 | 22 | 40 | 26 | 35 |
| Tensile strength, 160° C. (N/mm$^2$) | 5.1 | 6.6 | 5.3 | 5.0 | 5.3 | 5.8 | 4.0 | 7.1 | 6.0 | 5.2 | 6.2 | 6.4 | 5.8 | 5.6 | 6.5 |
| Elongation at break, 160° C. (%) | 405 | 110 | 525 | 450 | 500 | 610 | 25 | 655 | 550 | 50 | 630 | 495 | 375 | 605 | 630 |
| Tensile strength, 23° C. (N/mm$^2$) | 35.4 | 31.3 | 41.2 | 39.5 | 43.4 | 42.8 | 24.9 | 47.4 | 41.1 | 24.6 | 43.2 | 36.0 | 40.9 | 43.7 | 44.5 |
| Elongation at break, 23° C. (%) | 350 | 150 | 390 | 405 | 400 | 425 | 55 | 455 | 410 | 45 | 420 | 390 | 415 | 460 | 430 |

*Tensile and elongation values, measured at 180° C.:
Example 15: 4.2 N/mm$^2$; 480%
Comparison Example L: 4.6 N/mm$^2$; 65%

The abbreviations used in the above Tables I, II and III have the following meanings:

$I = CF_2=CF-O-CF_2-CF_2-CF_3$ $II = CF_2=CF-O-CF(CF_3)-CF_2-O-CF_2-CF_2-CF_3$ $III = CH_2=CH-CH_2-O-CF_2-CF_2H$ $IV = CH_2=CH-O-C(=O)-CH_3$

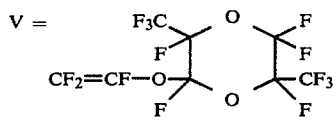

$VI = CH_2=CH-n-C_6F_{13}$ $VII = CH_2=CH-CH_2-C(CF_3)_2-OH$ $VIII = CF_2=CF-n-C_5F_{11}$
$IX = CH_2=CH-O-CF_2-CF_2H$
MDE = diethyl malonate
CHX = cyclohexane
F 113 = 1,1,2-trichlorotrifluoroethane

EXAMPLE 19

From the granules prepared from the melt of the product of Example 1, a 250 μm thick wire-coating is produced under the following conditions:

Extruder: Extrusiometer from Messrs. Göttfert: composition temperature: 340° C.; wire material: Cu wire, AWG 24/1, silvered; wire preheating: 80° to 150° C.; nozzle diameter: 5.5 mm; mandrel diameter: 3.5 mm; nozzle temperature: 340° C.; extrusion speed: 36 m/minute.

The sheathed wire obtained is subjected to a stress-cracking test at 200° C. Five wire pieces, tested parallel to one another, pass this test.

The wire sheathing is pulled off and tested for its tensile strength and elongation at break, at room temperature. A tensile strength of 47 N/mm² and an elongation at break of 250% are measured.

COMPARISON EXAMPLE M

From the granules prepared from the melt of the product according to Comparison Example A, a 250 μm thick wire-coating is prepared as described under Example 19. This wire is also exposed to a stress-cracking test at 200° C. Of five wire pieces tested in parallel, two show cracks in the insulation. The remaining three test specimens give breakdowns in the electrical test.

The pulled-off wire-coating shows a tensile strength of 45 N/mm² and an elongation at break of 185%, measured at 23° C.

As will be seen from a comparison of the results of Example 19 with the results of Comparison Example M, the wire-coating produced from the quaterpolymer according to the invention shows, at a comparable incorporation of perfluoro-(propyl vinyl) ether, a better stress-cracking behavior and better values of the tensile strength and elongation at break than the wire-coating produced from the corresponding terpolymer.

EXAMPLES 20 AND 21

In Examples 20 and 21, granules prepared from the melt of the products of Examples 4 and 15 are processed under the following conditions to give a 125 μm thick wire-coating: extruder: Extrusiometer from Messrs. Göttfert; composition temperature: 340° C.; wire material: Cu wire, AWG 24/1, silvered; wire preheating: 80° to 150° C.; nozzle diameter: 5.5 mm; mandrel diameter: 3.5 mm; nozzle temperature: 340° C.; extrusion speed: 60 m/minute.

Immediately after the preparation, the wire-coatings are tested for electrical defects, using a test voltage of 8 kV. The wire-coatings prepared according to Examples 20 and 21 do not show any breakdown over a length of 1,000 m of wire.

Comparison Example N

A commercially available terpolymer which contains, as the "bulky" third component in addition to ethylene and tetrafluoroethylene, a vinyl monomer of the formula $$CH_2=CH-CH_2-C(CF_3)_2-OH$$

and has an MFI$_{11}$ value (300° C.) of 37 g/10 minutes, a melting point (DSC) of 277° C., a fluorine content of 60.7% and a density of 1.713, is processed under the conditions indicated in Examples 18 and 19 to give a 125 μm thick wire-coating and is tested for electrical defects. When testing five times, between 40 and 140 electrical breakdowns are found per 1,000 m. A breakdown-free wire-coating cannot be obtained, even if the processing temperature is raised or lowered by 10° C.

EXAMPLE 22

A 250 μm thick wire-coating is produced according to Example 19 from the quaterpolymer of Example 10 and is then pulled off. A tensile strength of 56 N/mm² and an elongation at break at 215% are measured at 23° C. on this wire-coating. After the wire has been stored for ten days at 190° C., a tensile strength of the wire-coating of 38 N/mm² and an elongation at break of 200% are measured, each at 23° C.

In the stress-cracking test at 200° C., no cracks or electrical breakdowns are found on five wire pieces tested in parallel.

A 125 μm thick wire-coating is also produced according to Example 20 from the quaterpolymer of Example 10; this does not show any electrical defects over a length of 1,000 m.

I claim:
1. A thermoplastic fluorine-containing quaterpolymer having a melting point between 245° and 280° C. measured as the minimum of the melting curve by differential thermal analysis and consisting essentially of copolymerized units, in mole percent, of
    (a) from 55% to 30% tetrafluoroethylene,
    (b) from 60% to 40% ethylene,
    (c) from 10% to 1.5% hexafluoropropylene, and
    (d) from 2.5% to 0.05% of a vinyl monomer selected from one of the classes consisting of
        (d$_1$) perfluorinated olefins of the formula

$$CF_2=CF-Rfl$$

wherein RF1 is a perfluoroalkyl group having from 2 to 10 carbon atoms,
(d2) perfluorinated vinyl ethers of the formula $$CF_2=CF-O-Rf2$$

wherein Rf2 is a perfluoroalkyl group having from 2 to 10 carbon atoms,
(d3) perfluorinated vinyl ethers of the formula

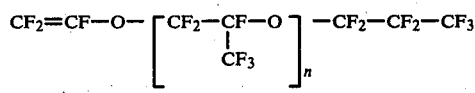

wherein n is an integer from 1 to 4,
(d4) perfluorinated vinyl ethers of the formula

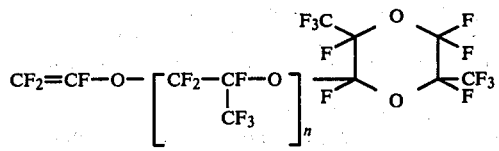

wherein n is 1 or zero,
(d5) perfluoro-2-methylene-4-methyl-1.3-dioxolane,
(d6) perfluorinated vinyl ethers of the formula $$CF_2=CF-O-(CF_2)_n-COX_1$$

wherein $X_1$ is F, OH, $OR_1$, or $NR_2R_3$, $R_1$ is an alkyl group having from 1 to 3 carbon atoms, $R_2$ and $R_3$ each are H or identical with $R_1$, and n is an integer from 1 to 10,
(d7) perfluorinated vinyl ethers of the formula

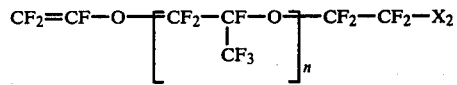

wherein $X_2$ is $COOR_4$, COOH, or CN, $R_4$ is an alkyl group having from 1 to 4 carbon atoms, and n is an integer from 1 to 4,
(d8) perfluoroalkyl-substituted vinyl compounds of the formula $$CH_2=CH-Rf3$$

wherein Rf3 is a perfluoroalkyl group having from 2 to 10 carbon atoms,
(d9) 1.1.1-trifluoro-2-(trifluoromethyl)-4-pentene-2-ol,
(d10) allyl-2-hydroxyhexafluoroisopropyl ether,
(d11) fluorinated allyl ethers of the formula $$CH_2=CR_5-CH_2-O-CF_2-CFX_3H$$

wherein $X_3$ is F, Cl or trifluoromethyl, and $R_5$ is H or $CH_3$ and
(d12) fluorinated vinyl ethers of the formula $$CH_2=CH-O-CF_2-CFX_3H$$

wherein $X_3$ is F, Cl or trifluoromethyl.

2. A thermoplastic fluorine-containing quaterpolymer having a melting point between 245° and 280° C. measured as the minimum of the melting curve by differential thermal analysis and consisting essentially of copolymerized units, in mole percent, of
(a) from 55% to 30% tetrafluoroethylene,
(b) from 60% to 40% ethylene,
(c) from 10% to 1.5% hexafluoropropylene, and
(d) from 2.5% to 0.05% of a vinyl monomer selected from one of the classes consisting of
(d1) perfluorinated olefins of the formula $$CF_2=CF-Rf1$$

wherein Rf1 is a perfluoroalkyl group having from 2 to 10 carbon atoms,
(d2) perfluorinated vinyl ethers of the formula $$CF_2=CF-O-Rf2$$

wherein Rf2 is a perfluoroalkyl group having from 2 to 10 carbon atoms,
(d3) perfluorinated vinyl ethers of the formula

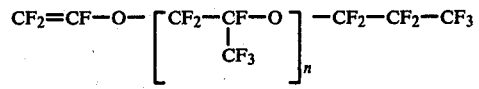

wherein n is an integer from 1 to 4, and
(d4) perfluorinated vinyl ethers of the formula

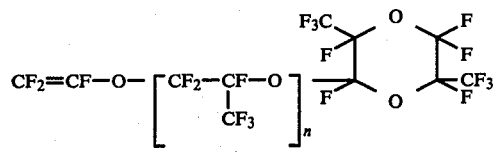

wherein n is 1 or zero.

3. A thermoplastic fluorine-containing quaterpolymer having a melting point between 245° and 280° C. measured as the minimum of the melting curve by differential thermal analysis and consisting essentially of copolymerized units, in mole percent, of
(a) from 55% to 30% tetrafluoroethylene,
(b) from 60% to 40% ethylene,
(c) from 10% to 1.5% hexafluoropropylene, and
(d) from 2.5 to 0.05% of a vinyl monomer selected from one of the classes consisting of
(d8) perfluoroalkyl-substituted vinyl compounds of the formula $$CH_2=CH-Rf3$$

wherein Rf3 is a perfluoroalkyl group having from 2 to 10 carbon atoms,
(d9) 1.1.1-trifluoro-2-(trifluoromethyl)-4-pentene-2-ol,
(d11) fluorinated allyl ethers of the formula $$CH_2=CR_5-CH_2-O-CF_2-CFX_3H$$

wherein $X_3$ is F, Cl, or trifluoromethyl, and $R_5$ is H or $CH_3$, and
(d12) fluorinated vinyl ethers of the formula $$CH_2=CH-O-CF_2-CFX_3H$$

wherein $X_3$ is F, Cl, or trifluoromethyl.

4. The quaterpolymer of claim 1 which consists essentially of
   (a) from 55% to 40% tetrafluoroethylene,
   (b) from 55% to 45% ethylene,
   (c) from 8% to 3% hexafluoropropylene, and
   (d) from 1% to 0.1% of a vinyl monomer selected from one of the classes of from ($d_1$) to ($d_{12}$).

5. The quaterpolymer of claim 1 which consists essentially of
   (a) from 55% to 40% tetrafluoroethylene,
   (b) from 55% to 45% ethylene,
   (c) from 5% to 3% hexafluoropropylene, and
   (d) from 0.8% to 0.2% of a vinyl monomer selected from one of the classes of from ($d_1$) to ($d_{12}$).

6. The quaterpolymer of claim 1 in which the vinyl monomer (d) is a perfluorinated olefin of the formula $CF_2=CF-Rf1$ wherein Rf1 is a perfluoroalkyl group having from 2 to 5 carbon atoms.

7. The quaterpolymer of claim 1 in which the vinyl monomer (d) is a perfluorinated vinyl ether of the formula $CF_2=CF-O-RF2$ wherein Rf2 is a perfluoroalkyl group having from 2 to 4 carbon atoms.

8. The quaterpolymer of claim 1 in which the vinyl monomer (d) is a perfluorinated ether of the formula

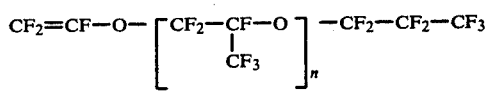

wherein n is an integer of 1 or 2.

9. The quaterpolymer of claim 1 in which the vinyl monomer (d) is a perfluorinated vinyl ether of the formula

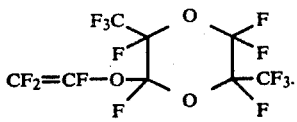

10. The quaterpolymer of claim 1 in which the vinyl monomer (d) is a perfluoroalkyl-substituted vinyl compound of the formula $CH_2=CH-Rf3$ wherein Rf3 is a perfluoroalkyl group having from 2 to 6 carbon atoms.

11. The quaterpolymer of claim 1 in which the vinyl monomer (d) is 1.1.1-trifluoro-2-(trifluoromethyl)-4-pentene-2-ol.

12. The quaterpolymer of claim 1 in which the vinyl monomer (d) is an allyl ether of the formula $$CH_2=CR_5-CH_2-O-CF_2-CFX_3H$$

wherein $R_5=H$ or $CH_3$ and $X_3=F$, Cl or $CF_3$.

13. The quaterpolymer of claim 1 in which the vinyl monomer (d) is a vinyl ether of the formula $$CH_2=CH-O-CF_2-CF_2H.$$

14. The quaterpolymer of anyone of claims 1 to 11 having a melt flow index of from 5 to 200 g/min measured at 300° C. under a load of 11 kg.

15. The quaterpolymer of anyone of claims 1 to 11 having a melt flow index of from 15 to 50 g/min measured at 300° C. under a load of 11 kg.

16. The quaterpolymer of claim 1 in the form of an extruded article.

17. The quaterpolymer of claim 1 in the form of a filament.

18. The quaterpolymer of claim 1 in the form of a wire coating.

* * * * *